United States Patent
Kim et al.

(10) Patent No.: US 8,678,978 B2
(45) Date of Patent: Mar. 25, 2014

(54) METHOD OF CONTROLLING HAC OPERATION WHEN RESTARTING ENGINE OF VEHICLE

(75) Inventors: Sejun Kim, Seoul (KR); Chongah Gwon, Hwaseong-si (KR); Jiyong Yu, Pocheon-si (KR); Junghwan Bang, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 278 days.

(21) Appl. No.: 13/213,903

(22) Filed: Aug. 19, 2011

(65) Prior Publication Data

US 2012/0142493 A1 Jun. 7, 2012

(30) Foreign Application Priority Data

Dec. 3, 2010 (KR) .................. 10-2010-0122813

(51) Int. Cl.
*B60T 7/22* (2006.01)
*B60W 10/06* (2006.01)

(52) U.S. Cl.
USPC ........................ 477/194; 477/200; 477/904

(58) Field of Classification Search
USPC ......... 477/187, 189, 194, 195, 199, 200, 904
See application file for complete search history.

(56) References Cited

U.S. PATENT DOCUMENTS

| 7,226,389 | B2 * | 6/2007 | Steen et al. .................. 477/195 |
| 7,585,250 | B2 * | 9/2009 | Braun et al. ................. 477/200 |
| 8,157,705 | B2 * | 4/2012 | Yu et al. ...................... 477/200 |
| 8,396,618 | B2 * | 3/2013 | Cikanek et al. ............... 701/22 |
| 2011/0065548 | A1 * | 3/2011 | Yu et al. ...................... 477/203 |

FOREIGN PATENT DOCUMENTS

| JP | 11-123957 A | 5/1999 |
| JP | 2000-313253 A | 11/2000 |
| JP | 2006-82629 A | 3/2006 |
| JP | 2006-306300 A | 11/2006 |
| JP | 2010-52568 A | 3/2010 |
| KR | 2000-0038609 A | 7/2000 |

* cited by examiner

*Primary Examiner* — Roger Pang
(74) *Attorney, Agent, or Firm* — Morgan, Lewis & Bockius LLP

(57) ABSTRACT

A method and a HAC system controls a hill-state assist control (HAC) operation when restarting an engine of the vehicle having an idle stop and go (ISG) system for an automatic transmission. The method includes starting restarting of the engine by the ISG system and an HAC operation, monitoring the RPM of the engine, and releasing the HAC operation in a case where the RPM of the engine meets an HAC release condition, and maintaining the HAC operation until the HAC release condition is met in a case where the RPM of the engine does not meet the HAC release condition.

5 Claims, 4 Drawing Sheets

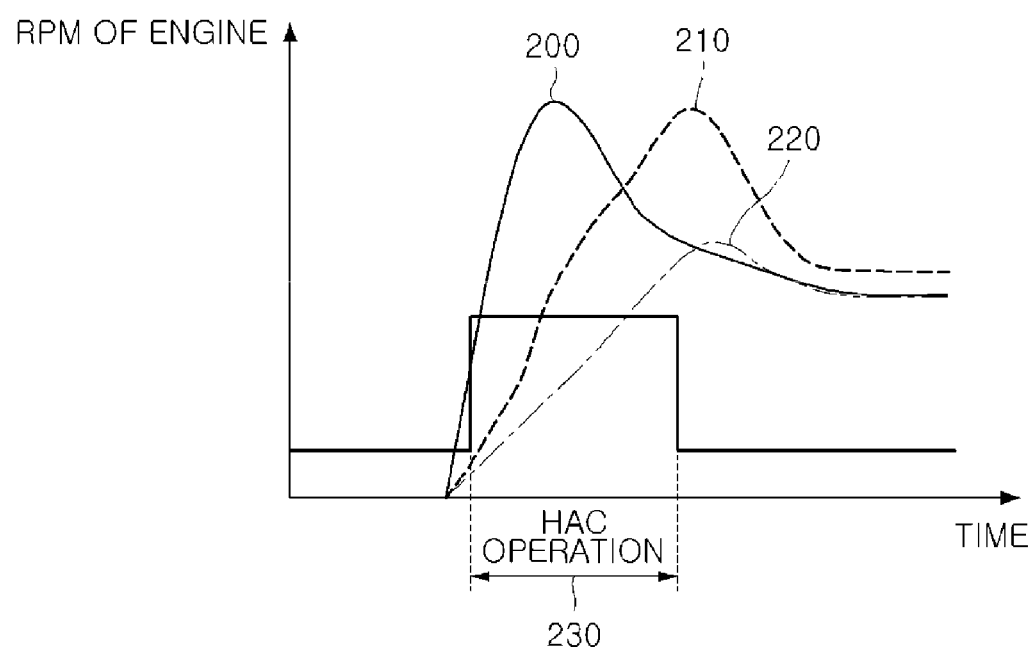

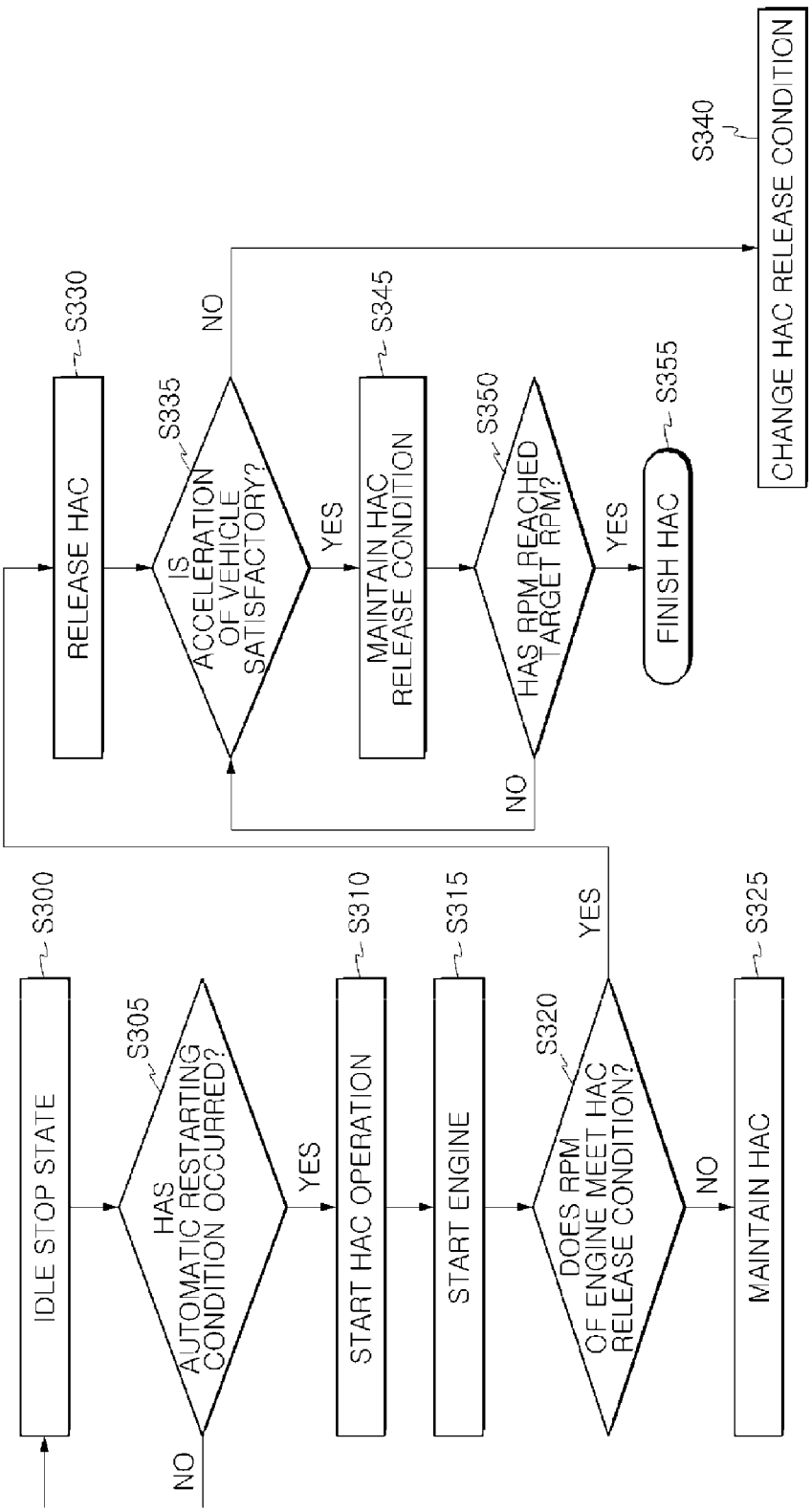

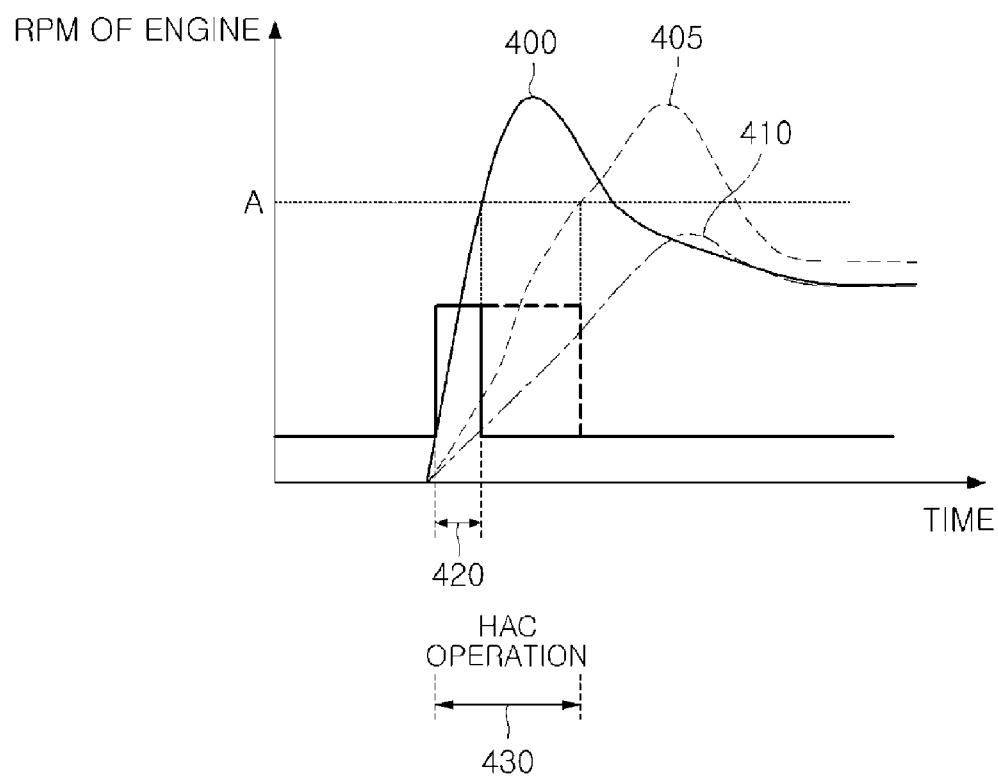

METHOD OF CONTROLLING HAC OPERATION WHEN RESTARTING ENGINE OF VEHICLE

CROSS-REFERENCE TO RELATED APPLICATIONS

The present application claims priority to Korean Patent Application Number 10-2010-0122813 filed Dec. 3, 2010, the entire contents of which application is incorporated herein for all purposes by this reference.

BACKGROUND OF INVENTION

1. Field of Invention

The present invention relates to a method of controlling a hill-start assist control (HAC) operation when an engine is restarted in a vehicle which includes an idle stop and go (ISG) system for an automatic transmission and an HAC system.

2. Description of Related Art

The ISG system is an engine control system that has a function of automatically turning off an engine of a vehicle under a predetermined condition, for example, when the engine maintains an idle state during a predetermined time period after the vehicle stops, and then automatically turning on the engine when restarting is required, so as to make normal driving possible.

In the past, the ISG system was applied to only manual transmissions. However, recently, the ISG system is applicable to vehicles with automatic transmissions. In a case of an ISG system installed in a vehicle with an automatic transmission, in a stop state, the vehicle is automatically restarted in a state in which the transmission is in the D stage. That is, a vehicle with an ISG system for an automatic transmission is automatically restarted in a state in which the transmission is in the D stage, regardless of the will of a driver, unlike an existing ISG for a manual transmission.

In the vehicle with the ISG system for an automatic transmission, the engine is automatically restarted in a state in which the transmission is in the D stage, regardless of the will of a driver, unlike an existing ISG for a manual transmission. Therefore, during the restarting, there is a danger that the vehicle moves forward (sudden acceleration or the like), and the vehicle may vibrate back and forth to make the driver feel uncomfortable (a reduction in driveability).

In order to solve the problems, there have been efforts to reduce a feeling of discomfort against the vehicle with the ISG system for an automatic transmission by operating an HAC system during a predetermined time period after starting the engine. However, since the restarting state of the engine varies according to temperature, pressure, the property of fuel, and the like, it is impossible to provide a constant feeling of driving to the drive. Further, since the characteristics of the HAC system also variously change according to the fluid-pressure formation characteristic of a brake system before the HAC system is operated, the degree of wear/aging of a friction material, and the like, control different from an existing purpose is often performed.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for optimal driveability and safety by performing control according to situations and characteristics, unlike the restrictive and ineffective technology according to the related art that attempted to reduce a feeling of discomfort by operating the HAC system during the predetermined time period.

Other aspects of the present invention provide for a method of controlling an hill-state assist control (HAC) operation when restarting an engine of the vehicle having an idle stop and go (ISG) system for an automatic transmission and a HAC system, the method including starting restarting of the engine by the ISG system and an HAC operation, monitoring the RPM of the engine, and releasing the HAC operation in a case where the RPM of the engine meets an HAC release condition, and maintaining the HAC operation until the HAC release condition is met in a case where the RPM of the engine does not meet the HAC release condition.

The method may further include determining whether the vehicle meets a predetermined initial acceleration in a case whether the HAC operation is released.

Also, the method may further include maintaining the HAC release condition in a case where the vehicle meet the initial acceleration, and changing the HAC release condition where the vehicle does not meet the initial acceleration.

The HAC release condition may be stored in a memory device.

The changed HAC release condition may be stored in a memory device.

Various aspects of the present invention control the HAC system according to situations and characteristics, so as to provide optimal driveability and safety in a vehicle with an ISG system for an automatic transmission.

Further, the HAC operation period and the control mode are changed on the basis of an increasing characteristic of the RPM of the engine during starting, and back and forth acceleration characteristics of the vehicle, so as to provide maximal safety.

In conclusion, response to a change in the drive condition is possible and it is possible to actively respond to a change (aging/replacement) of the engine of the vehicle and the power transmission system such as the transmission. Further, it is possible to improve the safety of the vehicle, secure the reliability of the product, and respond to various driveability problems of the vehicle with the ISG system for an automatic transmission.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is a view illustrating a change in the RPM of an engine in the method of operating the HAC system during the predetermined time period.

FIG. 3 is a view illustrating logics relative to an exemplary method of controlling an HAC operation when an engine of a vehicle is restarted according to the present invention.

FIG. 4 is a view illustrating an exemplary change in the RPM of an exemplary engine according to the present invention.

Figure 1:
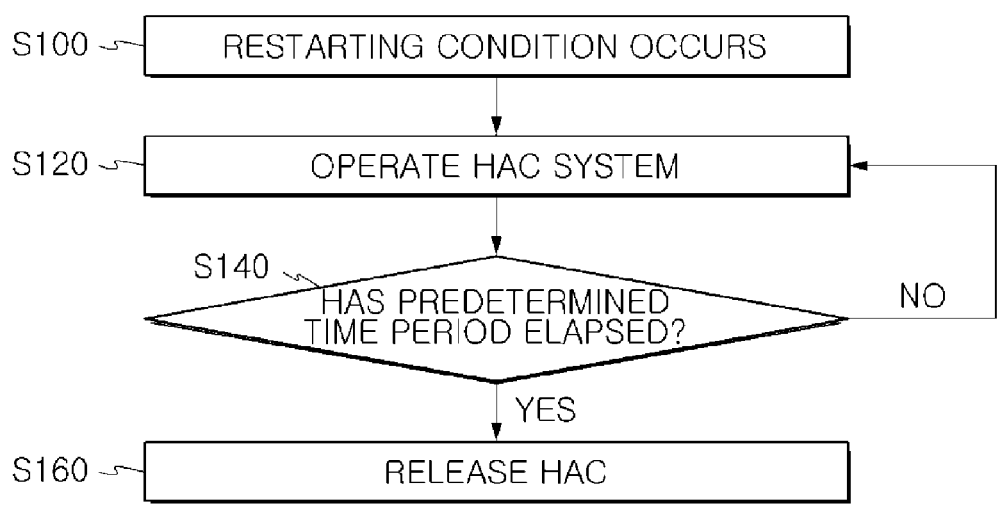
FIG. 1 is a view illustrating logics relative to a method of operating an HAC system during a predetermined time period

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIG. 1, in a case where a vehicle with an automatic transmission is restarted in an idle stop state into a go state (S100), an HAC system is operated (S120). In this case, the HAC system operates during a predetermined time period (S140) so as to prevent the speed of the vehicle from being suddenly accelerated. That is, since the HAC system operates only during the predetermined time period regardless of the state of the vehicle, if the state of the vehicle is changed, it is impossible to provide a constant feeling of driving.

That is, referring to FIG. 2, two graphs 200 and 210 represent changes in the RPM of the engine in a case where the HAC system does not operate when the vehicle with the automatic transmission is restarted. If the HAC system operates during a predetermined time 230, first graph 200 is stabled without an upward protruding portion, like a third graph 220. However, in a case where the state of the vehicle changes to have the RPM shape of second graph 210, even though the HAC system operates during predetermined time period 230, the shape of third graph 220 does not appear. That is, in a case of setting the HAC operation period into a predetermined time period, during starting, the effects act in different forms according to the increasing shape of the RPM of the engine and the vehicle durability progression state. Therefore, it is required to provide a constant feeling of driving by responding to a change in the characteristics of the vehicle.

Various embodiments of the present invention for solving the above-mentioned problem will be described below.

First, referring to FIG. 3, in a case where the vehicle is in an idle stop state (S300), if a condition for restarting into a go state occurs (S305), an HAC operation starts (S310). At the same time, the engine restarts (S315). As the engine restarts, the RPM increases. The RPM does not suddenly increase due to the HAC operation. The HAC operation prevents the RPM from suddenly increasing so as to reduce a sudden acceleration feel and provide stability to the driver. However, if the HAC operation is performed for too much time, the acceleration feel is reduced against the will of the driver. In contrast, if the HAC operation is performed for too short time, the effect in which the sudden acceleration is reduced is hindered. Therefore, according to the state of the vehicle from moment to moment, an HAC release condition is set in order to control the HAC operation. In the illustrated exemplary embodiment, the RPM of the engine is monitored, and a condition is set to release the HAC in a case when the RPM exceeds a specific RMP. This condition can be changed in future, and can be stored in a memory device.

Referring to FIG. 4, the HAC release condition is set to a RPM value 'A'. Therefore, in a first graph 400, if the RPM increases and reaches the RPM value 'A', the HAC release condition is met an thus the HAC is released. Further, in a second graph 405, if the RPM increases and reaches the RPM value 'A', the HAC is released. That is, in first graph 400, the HAC is performed for a definite time period 420, and in second graph 405, the HAC is performed for a time period different from first graph 400. As a result, even when the change of the RPM varies according to the state of the vehicle, the HAC operation can be controlled according to the situation so as to provide a constant feeling of driving to the driver. The HAC release condition may use a specific RPM as a reference as described above. However, another factor such as the rising slope of the RPM may be monitored and a HAC release condition may be set on the basis of another factor. Also, in the illustrated exemplary embodiment, the RPM value 'A' may be set to a specific value according to the state of the vehicle.

In FIG. 3, as described above, if the RPM of the engine meets the HAC release condition (S320), the HAC is released (S330). If the RPM of the engine does not meet the HAC release condition, and the HAC is maintained until the RPM further increases to meet the HAC release condition (S325).

Hereinafter, it is determined whether the release condition provides an appropriate feeling of driving, and the release condition can be reset when the release condition does not provide an appropriate feeling of driving. That is, after an appropriate initial acceleration is set, it is determined whether the vehicle is appropriately accelerated after the HAC is released (S335). If the acceleration of the vehicle is an appropriate initial acceleration to provide stability to the driver, the HAC release condition is appropriate and thus is maintained (S345). However, if the acceleration does not meet an initial acceleration so as not to provide stability to the driver, the HAC release condition needs to be changed and thus is reset (S340). That is, in a case where the HAC is released too late such that the initial acceleration of the vehicle is too slow, or a case where the HAC is released too early such that the vehicle is suddenly accelerated, the HAC release condition may be reset (the RPM value condition for releasing the HAC may be reset) so as to reach an initial acceleration providing stability to the driver. Further, the logics of various embodiments of the present invention may be continuously fed back, and HAC release conditions may be stored in a memory whenever the conditions are performed and control factors are learned, so as to be used as an initial set condition in future performance. Therefore, it is possible to provide optimal driveability and safety to the driver.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling a hill-state assist control (HAC) operation when restarting an engine of the vehicle having an idle stop and go (ISG) system for an automatic transmission and an HAC system, the method comprising:
   starting restarting of the engine by the ISG system and an HAC operation;
   monitoring an RPM of the engine;
   releasing the HAC operation when the RPM of the engine meets an HAC release condition, and maintaining the HAC operation until the HAC release condition becomes met when the RPM of the engine does not meet the HAC release condition; and
   determining whether the vehicle meets a predetermined initial acceleration in a case when the HAC operation is released.

2. The method as defined in claim 1, further comprising:
   changing the HAC release condition in a case that the vehicle does not meet the initial acceleration.

3. The method as defined in claim 1, wherein the HAC release condition is stored in a memory device.

4. The method as defined in claim 2, wherein the changed HAC release condition is stored in a memory device.

5. A vehicle including the method of controlling an hill-state assist control (HAC) according to claim 1.

* * * * *